(12) United States Patent
Lee (10) Patent No.: US 8,859,639 B2
(45) Date of Patent: *Oct. 14, 2014

(54) CAPSULATED COLORANT, METHOD OF PREPARING THE SAME, AND INK COMPOSITION INCLUDING THE CAPSULATED COLORANT

(75) Inventor: Jong-in Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 683 days.

This patent is subject to a terminal disclaimer.

(21) Appl. No.: 12/177,908

(22) Filed: Jul. 23, 2008

(65) Prior Publication Data

US 2009/0043036 A1  Feb. 12, 2009

(30) Foreign Application Priority Data

Aug. 9, 2007  (KR) .................. 10-2007-0080327

(51) Int. Cl.
| | |
|---|---|
| C09D 11/00 | (2014.01) |
| C09C 3/10 | (2006.01) |
| C08L 81/08 | (2006.01) |
| C09B 67/08 | (2006.01) |
| C09D 11/32 | (2014.01) |
| C09C 1/56 | (2006.01) |

(52) U.S. Cl.
CPC ... C09C 1/56 (2013.01); C09C 3/10 (2013.01); C08L 81/08 (2013.01); C09B 67/0013 (2013.01); C09D 11/32 (2013.01)
USPC ............ 523/160; 347/1; 347/100; 523/161; 523/200; 523/205; 523/206; 524/515; 524/521; 524/522; 524/523; 524/525; 524/527

(58) Field of Classification Search
CPC ............ C09C 1/56; C09C 3/10; C09D 11/30; C09D 11/32; C09D 11/40; C09D 11/322
USPC ............... 106/31.45, 31.58, 31.75, 31.86; 347/100, 1; 523/160, 161, 200, 205, 523/206; 524/555, 556, 558, 560, 515, 521, 524/522, 523, 525, 527

See application file for complete search history.

(56) References Cited

U.S. PATENT DOCUMENTS

| | | | |
|---|---|---|---|
| 5,661,197 A * | 8/1997 | Villiger et al. | ................ 523/161 |
| 5,773,534 A | 6/1998 | Antonelli et al. | |
| 6,455,220 B1 * | 9/2002 | Cheng | ..................... 430/137.14 |
| 6,602,333 B2 * | 8/2003 | Miyabayashi | ............ 106/31.27 |
| 7,008,977 B2 | 3/2006 | Sakai et al. | |
| 7,119,133 B2 | 10/2006 | Vincent et al. | |
| 7,521,085 B2 * | 4/2009 | Hall et al. | ................ 427/213.34 |
| 2002/0193514 A1 * | 12/2002 | Wang et al. | .................. 524/853 |
| 2004/0048969 A1 | 3/2004 | Kirsch et al. | |
| 2005/0176847 A1 * | 8/2005 | Cagle | ............. 523/160 |
| 2007/0219291 A1 * | 9/2007 | Doi et al. | ........................ 523/160 |
| 2008/0026221 A1 * | 1/2008 | Vincent et al. | ................ 428/407 |
| 2008/0269374 A1 * | 10/2008 | Ganapathiappan | ........... 523/201 |
| 2009/0025601 A1 * | 1/2009 | Vasudevan et al. | ......... 106/31.65 |

FOREIGN PATENT DOCUMENTS

| | | |
|---|---|---|
| JP | 2004-517200 | 6/2004 |
| KR | 1995-7001354 | 3/1995 |
| KR | 2005-0054037 | 6/2005 |
| KR | 1020070074033 | 7/2007 |

OTHER PUBLICATIONS

Korean Office Action issued Apr. 10, 2012 in KR Application No. 10-2007-0080327.
Korean Notice of Allowance dated Oct. 29, 2012 issued in KR Application No. 2007-0080327.

* cited by examiner

Primary Examiner — David W Wu
Assistant Examiner — Marie Reddick
(74) Attorney, Agent, or Firm — Stanzione & Kim, LLP (57) ABSTRACT

A capsulated colorant including a colorant and a polymer resin which is coated on the colorant and has a cross-linked structure, a method of preparing the capsulated colorant, and an ink composition including the capsulated colorant. By adjusting the extent of cross-linking of the colorant on which the polymer having a cross-linked structure is coated, a capsulated colorant having a cross-linking of larger extent and a capsulated colorant having a cross-linking of smaller extent are obtained. By using an ink composition including the capsulated colorant having a larger cross-linked extent, characteristics of excellent waterfastness, lighffastness, rubfastness and optical density can be realized. In addition, by using the ink composition including the capsulated colorant having a smaller cross-linked extent, images with excellent durability and printed gloss can be realized.

3 Claims, 2 Drawing Sheets

CAPSULATED COLORANT, METHOD OF PREPARING THE SAME, AND INK COMPOSITION INCLUDING THE CAPSULATED COLORANT

CROSS-REFERENCE TO RELATED APPLICATIONS

This application claims priority under 35 U.S.C. §119(a) from Korean Patent Application No. 10-2007-0080327, filed on Aug. 9, 2007, in the Korean Intellectual Property Office, the disclosure of which is incorporated herein in its entirety by reference.

BACKGROUND OF THE INVENTION

1. Field of the Invention

The present general inventive concept relates to a capsulated colorant, a method of preparing the same, and an ink composition including the capsulated colorant, and more particularly, to a capsulated colorant in which a polymer resin with a cross-linked structure is coated on a surface of a colorant and an ink composition which can be used to simultaneously realize characteristics of excellent waterfastness, lighffastness, rubfastness, and optical density and realize images having excellent durability and printed gloss by containing the capsulated colorant having an extent of cross-linking which is varied.

2. Description of the Related Art

In inkjet printers, a coloring agent is generally defined as a material that exhibits a unique color by selectively absorbing or reflecting visible light. Coloring agents can be divided into dyes and pigments.

A dye is a coloring agent that is printed on and absorbed into a material, such as fiber, leather, fur, paper, or the like, so that the printed material has excellent color fastness with respect to solar cleaning, rubbing, and the like. A pigment is a micro particle having a coloring agent, and is not directly absorbed into but is instead adhered to the surface of a material using a physical method, such as adhesion or the like, so that the printed material has a unique color.

Dyes are mixed and dissolved in solvents, such as water, or the like, but pigments are generally not dissolved in the solvents. Therefore, a crucial aspect for forming pigments is to uniformly disperse pigment particulates in solvents and thereby, allow the formed dispersed state to remain stable permanently without re-aggregation.

Water-soluble dye-type ink is highly superior in terms of long-term storage stability, it keeps its uniformity and has clear color and brightness, however this ink is poor in waterfastness, lighffastness, etc.

Pigment type ink has high optical density (OD), good waterfastness and lighffastness and little bleeding among colors, however this ink is poorer in clarity of color tones and has weaker stability of long-term storage than the dye-type ink. In addition, images which are printed using the pigment type ink have poor dryfastness and wetfastness, that is, rubfastness.

Also, when printing in colors (multicolor printing) with dyes or pigments, bleeding occurs at interfaces of the colors, thereby reducing clearness of printed images.

Therefore, there is still a need for an ink composition which has excellent storage stability like water-soluble dye-type ink, has excellent waterfastness like pigment type ink, and also has improved printed gloss and rubfastness.

To enhance the rubfastness of ink, a method of adding a resin to an ink composition has been proposed. However, there is still an unsolved problem in that the viscosity of ink is increased due to the addition of the resin. In addition, to prevent the increase in the viscosity of ink, a method of adding resin particles to ink has been proposed. However, since the resin particles and pigments are separately dispersed in the ink which has resin particles added thereto, improvement in rubfastness of ink is not sufficient.

Therefore, addressing the above problems by adding new additives to an ink composition is limited. Accordingly, there is a need to improve properties of an ink composition by modifying a colorant used therein.

SUMMARY OF THE INVENTION

The present general inventive concept provides a capsulated colorant used in an ink composition which can realize characteristics of excellent waterfastness, lighffastness, rubfastness, and optical density, and realize images with excellent durability and printed gloss, by adjusting an extent of cross-linking of a polymer resin coated on a colorant included in the capsulated colorant The present general inventive concept also provides a method of preparing the capsulated colorant.

The present general inventive concept also provides an ink composition including the capsulated colorant.

The present general inventive concept also provides an ink set including at least two ink compositions.

The present general inventive concept also provides an ink cartridge for an inkjet recording device, the ink cartridge including the ink set.

The present general inventive concept also provides an inkjet recording device including the ink cartridge for an inkjet recording device.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a capsulated colorant including a colorant, and a polymer resin which coats the colorant and has a cross-linked structure.

The foregoing and/or other aspects and utilities of the present general inventive concept are also achieved by providing a method of preparing a capsulated colorant, including emulsifying a polymerization composition comprising an aqueous medium, a colorant, at least one polymerizable unsaturated monomer, a cross-linkable monomer, a chain transfer agent, an emulsifying agent, and a polymerization initiator, and polymerizing the polymerizable unsaturated monomer and the cross-linkable monomer on the colorant to form a polymer resin which is coated on a colorant and has a cross-linked structure.

The foregoing and/or other aspects and utilities of the present general inventive concept are also achieved by providing an ink composition including the capsulated colorant.

The foregoing and/or other aspects and utilities of the present general inventive concept are also achieved by providing an ink set including at least two ink compositions comprising the capsulated colorant.

The foregoing and/or other aspects and utilities of the present general inventive concept are also achieved by providing a cartridge for an inkjet recording device, including the ink set.

The foregoing and/or other aspects and utilities of the present general inventive concept are also achieved by providing an inkjet recording device including the cartridge for an inkjet recording device.

The foregoing and/or other aspects and utilities of the present general inventive concept are also achieved by providing a method of controlling an extent of cross-linking in a polymer coated capsulated colorant, the method including controlling at least one of an amount and injection method of a chain transfer agent during the preparation of the capsulated colorant, wherein the capsulated colorant is prepared by emulsifying a polymerization composition comprising a polymerizable unsaturated monomer, an aqueous medium, a colorant, a cross-linkable monomer, the chain transfer agent, an emulsifying agent, and a polymerization initiator, and polymerizing the polymerizable unsaturated monomer and the cross-linkable monomer on the colorant to form a polymer resin which is coated on a colorant and has a cross-linked structure.

The chain transfer agent may be controlled to be 0.05 to 2 parts by weight with respect to 100 parts by weight of the polymerizable unsaturated monomer to prepare a larger extent of cross-linking in the capsulated colorant, and the chain transfer agent may be controlled to be 2.5 to 4.5 parts by weight to prepare a lower extent of cross-linking in the capsulated colorant.

The foregoing and/or other aspects and utilities of the present general inventive concept are also achieved by providing a capsulated colorant usable in an ink composition, including a colorant, and cross-linked polymer resin coated on the colorant, wherein an amount of cross-linking of the polymer resin corresponds to a gel content of the colorant, and the gel content is 30-99%.

The capsulated colorant may further include a chain transfer agent to control an extent of cross-linking of the polymer resin.

The present general inventive concept provides a capsulated colorant in which a polymer resin having a cross-linked structure is coated on a surface of a colorant, and an ink composition which can be used to simultaneously realize characteristics of excellent waterfastness, lighffastness, rubfastness, and optical density and realize images having excellent durability and printed gloss by containing the capsulated colorant having an extent of cross-linking which is varied.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The present general inventive concept provides a capsulated colorant including a colorant, and a polymer resin which is coated on the colorant and has a cross-linked structure.

The colorant used herein may be any dye and pigment used in the art without limitation. That is, the colorant may be a direct dye, an acid dye, a food dye, an alkaline day, a reactive dye, a dispersing dye, an oil-based dye, any kind of pigment, a self-dispersing pigment, or mixtures thereof.

Examples of the dye of the colorant may include food black dyes, food red dyes, food yellow dyes, food blue dyes, acid black dyes, acid red dyes, acid blue dyes, acid yellow dyes, direct black dyes, direct blue dyes, direct yellow dyes, anthraquinone dyes, monoazo dyes, disazo dyes, a phthalocyanine derivative, and the like. Examples of a pigment of the colorant may include carbon black, graphite, vitreous carbon, activated charcoals, activated carbons, anthraquinone, phthalocyanine blue, phthalocyanine green, diazos, monoazos, pyranthrones, perylene, quinacridone, indigoid pigments, and the like. Examples of the self-dispersing pigment may include cabojet-series, CW-series from Orient Chemical, and the like. However, the present general inventive concept is not limited to the above-described examples.

The polymer resin having a cross-linked structure may be prepared by polymerizing a composition including a polymerizable unsaturated monomer, a cross-linkable monomer, and a chain transfer agent.

Herein, the polymerizable unsaturated monomer can be at least one of unsaturated carboxylic acid, cyanide vinyl monomer, unsaturated carboxylic alkylester, unsaturated carboxylic hydroxyalkyl ester, unsaturated carboxylic amide and its derivatives, aromatic vinyl monomer, methyl vinyl ketone, and vinylidene chloride.

In particular, the unsaturated carboxyl acid may be at least one of methacrylic acid, acrylic acid, itaconic acid, crotonic acid, fumaric acid, and maleic acid. The unsaturated polycarboxylic alkylester may be at least one of itaconic acid monoethyl ester, fumaric acid monobutyl ester, and maleic acid monobutyl ester. The cyanide vinyl monomer may be acrylonitrile or methacrylonitrile. The unsaturated carboxylic amide may be acrylamide, methacrylamide, itaconamide, maleic monoamide, or a derivative thereof. In addition, the aromatic vinyl monomer may be at least one of α-methylstyrene, vinyltoluene, or p-methylstyrene.

The cross-linkable monomer is a compound having at least two polymerizable unsaturated groups. In addition, the cross-linkable monomer provides the polymer resin coated on the colorant with a cross-linked structure, and thus can provide an effect of coating a compact polymer resin with a mesh-type structure on the capsulated colorant according to the present general inventive concept. As a result, an ink composition including the capsulated colorant can have a different printing gloss and printing concentration depending on how much the polymer resin is cross-linked.

The cross-linkable monomer may be selected from (meth)acrylate and a vinyl compound.

In particular, examples of (meth)acrylate may include trimethylolpropane tri(meth)acrylate, ditrimethylolpropane tetra(meth)acrylate, pentaerythritol tri(meth)acrylate, pentaerythritol tetra(meth)acrylate, dipentaerythritol penta(meth)acrylate, dipentaerythritol hexa(meth)acrylate, glycerol tri(meth)acrylate, tris(2-hydroxyethyl)isocyanurate tri(meth)acrylate, ethylene glycol di(meth)acrylate, 1,3-butanediol di(meth)acrylate, 1,4-butanediol di(meth)acrylate, 1,6-hexanediol di(meth)acrylate, neopentyl glycol di(meth)acrylate, diethylene glycol di(meth)acrylate, triethylene glycol di(meth)acrylate, dipropylene glycol di(meth)acrylate, bis(2-hydroxyethyl)isocyanurate di(meth)acrylate, poly(meth)acrylates of ethylene oxide or propylene oxide addition product of starting alcohols of these (meth)acrylates, oligoester (meth)acrylate, oligoether (meth)acrylate, oligourethane (meth)acrylate, oligoepoxy (meth)acrylate having at least two (meth)acryloyl groups in a molecule, and the like. The (meth)acrylate may be dipentaerythritol hexa(meth)acrylate, dipentaerythritol penta(meth)acrylate, pentaerythritol tetra(meth)acrylate, and ditrimethylolpropane tetra(meth) acrylate. Examples of the vinyl compound may include butadiene, divinylbenzene, ethylene glycol divinyl ether, diethylene glycol divinyl ether, triethylene glycol ether, and the like.

The chain transfer agent used to prepare the capsulated colorant according to the present general inventive concept improves printing properties of an ink composition which uses the capsulated colorant by adjusting a degree of polymerization, molecular weight and an extent of cross-linking of the polymer resin coated on the colorant.

The chain transfer agent may be a sulfur-containing compound, a phosphorous acid compound, a hypophosphorous acid compound, and alcohol, but is not limited thereto.

The chain transfer agent may be a sulfur-containing compound due to more efficient radical generation.

The sulfur-containing compound may be represented by Formula 1 below.

R—SH,   <Formula 1> wherein R is a substituted or unsubstituted C1-C20 alkyl group.

The sulfur-containing compound may be n-dodecyl mercaptan, t-dodecylmercaptan, t-hexadecylmercaptan, lauryl mercaptan, thioglycol acid, thioacetic acid, mercaptoethanol, and the like, but is not limited thereto.

The phosphorous acid compound may be phosphorous acid or sodium phosphorous acid. The hypophosphorous acid compound may be hypophosphorous acid or sodium hypophosphorous acid. Examples of alcohol may include methyl alcohol, ethyl alcohol, isopropyl alcohol, n-butyl alcohol, and the like.

The polymer resin having a cross-linked structure may have a gel content of 30-99%.

The term "gel content" (gel %) used herein represents a weight content of the polymer resin which is not dissolved in an organic solvent, and is a value which represents an extent of cross-linking in the polymer resin having a cross-linked structure.

The gel content may be measured by the following method: a weight of the polymer resin is measured, and a soluble material is then extracted from the polymer resin for 24 hours using Soxhlet extraction. A solvent used in the extraction process may be an additive used in the polymer resin and a solvent used in the polymer resin. For example, when the polymer resin is a styrene polymer, an acryl resin, or modified polypenylene ether, toluene may be used as a solvent. When the polymer resin is an olefin polymer or polyacetyl, trichlorobenzene may be used as a solvent. In addition, when the polymer resin is polyamide, hexafluoroisopropanol may be used as a solvent.

After the extraction process, all residues obtained are washed using acetone, and vacuum dried at 140° C. to obtain a dried material. A weight of the dried material is measured, and the measured weight is referred to as a dry weight after extraction. A gel content (%) is calculated by following equation.

Gel content(%)=(dry weight of polymer resin after extraction)(g)/(initial weight of polymer resin)(g)×100   <Equation>

When the gel content is less than 30%, a linear-type polymer resin having a small molecular weight is formed, and thus inefficiently coats the colorant. When the gel content is more than 99%, an unreacted monomer, and the like partially exist as a result of an actual polymerization reaction, and 100% polymerization cannot be obtained.

The present general inventive concept also provides a method of preparing a capsulated colorant, including forming a polymer resin which is coated on a colorant and has a cross-linked structure, wherein the polymer resin is formed by emulsifying a polymerization composition including a polymerizable unsaturated monomer, an aqueous medium, a colorant, a cross-linkable monomer, a chain transfer agent, an emulsifying agent, and a polymerization initiator; and polymerizing the polymerizable unsaturated monomer and the cross-linkable monomer on the colorant.

The polymerizable unsaturated monomer may be, as described above, at least one of unsaturated carboxylic acid, cyanide vinyl monomer, unsaturated carboxylic alkylester, unsaturated carboxylic hydroxyalkyl ester, unsaturated carboxylic amide and its derivative, and aromatic vinyl monomer.

The aqueous medium may be water or a mixed solution of water and an organic solvent. An amount of the aqueous medium may be 500-5,000 parts by weight, or may be 1,500-3,000 parts by weight, with respect to 100 parts by weight of the polymerizable unsaturated monomer. When the amount of the aqueous medium is less than 500 parts by weight with respect to 100 parts by weight of the polymerizable unsaturated monomer, a polymerization reaction is so fast that a coated polymer resin becomes too thick. When the amount of the aqueous medium is greater than 5,000 parts by weight with respect to 100 parts by weight of the polymerizable unsaturated monomer, it is difficult for the polymerizable unsaturated monomer and the cross-linkable monomer to move to each reaction site, and thus a polymerization reaction is so slow that a polymer resin can not be coated on the colorant.

The colorant may be, as described above, a direct dye, an acid dye, a food dye, an alkaline day, a reactive dye, a dispersing dye, an oil-based dye, any kind of pigment, a self-dispersing pigment, or mixtures thereof.

An amount of the colorant may be 100-300 parts by weight, or may be 150-250 parts by weight, with respect to 100 parts by weight of the polymerizable unsaturated monomer. When the amount of the colorant is less than 100 parts by weight with respect to 100 parts by weight of the polymerizable unsaturated monomer, an amount of a polymer resin coated on the colorant is too high. When the amount of the colorant is greater than 300 parts by weight with respect to 100 parts by weight of the polymerizable unsaturated monomer, an amount of a polymer resin coated on the colorant is too small.

The cross-linkable monomer may be, as described above, selected from (meth)acrylate and a vinyl compound.

An amount of the cross-linkable monomer may be 10-80 parts by weight, and may also be 20-60 parts by weight, with respect to 100 parts by weight of the polymerizable unsaturated monomer. When the amount of the cross-linkable monomer is less than 10 parts by weight with respect to 100 parts by weight of the polymerizable unsaturated monomer, an extent of cross-linking is too low so that a polymer resin having an excessively large molecular weight is synthesized. When the amount of the cross-linkable monomer is greater than 80 parts by weight with respect to 100 parts by weight of the polymerizable unsaturated monomer, an extent of cross-linking is too high so that particles of a polymer resin are not big enough to coat the colorant.

The chain transfer agent may be, as described above, selected from a sulfur-containing compound, a phosphorous acid compound, a hypophosphorous acid compound, and alcohol.

An amount of the chain transfer agent may be 0.05-5 parts by weight, and may also be 0.5-2 parts by weight, with respect to 100 parts by weight of the polymerizable unsaturated monomer. When the amount of the chain transfer agent is less than 0.05 parts by weight with respect to 100 parts by weight of the polymerizable unsaturated monomer, an extent of cross-linking is too high. When the amount of the chain transfer agent is greater than 5 parts by weight with respect to 100 parts by weight of the polymerizable unsaturated monomer, an extent of cross-linking is too low.

The emulsifying agent may be a non-ionic emulsifying agent, an anionic emulsifying agent, or an ampholytic emulsifying agent containing quantum.

An amount of the emulsifying agent may be 0.01-5 parts by weight, and may also be 0.1-2 parts by weight, with respect to 100 parts by weight of the polymerizable unsaturated monomer. When the amount of the emulsifying agent is less than 0.01 parts by weight with respect to 100 parts by weight of the polymerizable unsaturated monomer, it is less than critical emulsification concentration, and thus emulsification polymerization is not efficient. When the amount of the emulsifying agent is greater than 5 parts by weight with respect to 100 parts by weight of the polymerizable unsaturated monomer, a large amount of bubbles are generated even after the emulsification polymerization reaction is terminated, due to the excessive use of the emulsifying agent.

A method of emulsification may be direct emulsification for an ink composition including a polymerizable unsaturated monomer and a colorant, in which the colorant is dispersed in the polymerizable unsaturated monomer is emulsified in an aqueous medium with an emulsifying agent added using a mixer, such as a homo mixer, a line mixer, high pressure homogenizer, or the like, or natural emulsification in which an emulsifying agent is added to an ink composition including a polymerizable unsaturated monomer and a colorant, wherein the colorant is dispersed in the polymerizable unsaturated monomer, and then the mixture is poured into a large amount of water.

In addition, the method of emulsification may be phase inversion emulsification in which an emulsifying agent is added to an ink composition including a polymerizable unsaturated monomer and a colorant, wherein the colorant is dispersed in the polymerizable unsaturated monomer, and water is then added to the mixture little by little while the mixture is stirred.

The polymerization initiator may be water-soluble or fat-soluble persulfate, peroxide, an azo compound, or peroxide and a reducing agent, for example, a redox composition comprised in combination of sulfite. Examples of the polymerization initiator may include ammonium persulfate, potassium persulfate, sodium persulfate, hydrogen peroxide, t-butyl hydroperoxide, t-butyl peroxybenzoate, 2,2-azobis-isobutyronitrile, 2,2-azobis(2-diaminopropane) hydrochloride, 2,2-azobis(2,4-dimethylvaleronitrile), and the like.

An amount of the polymerization initiator may be 0.05-3 parts by weight, and may also be 0.5-1.5 parts by weight, with respect to 100 parts by weight of the polymerizable unsaturated monomer. When the amount of the polymerization initiator is less than 0.05 parts by weight with respect to 100 parts by weight of the polymerizable unsaturated monomer, a reaction is not satisfactorily initiated, and thus the reaction occurs too slowly. When the amount of the polymerization initiator is greater than 3 parts by weight with respect to 100 parts by weight of the polymerizable unsaturated monomer, a reaction speed is so fast that the reaction can not be controlled.

The polymerization initiator may be added in an early stage of a reaction together with other materials participated in the polymerization reaction, that is, a polymerizable unsaturated monomer, an aqueous medium, a colorant, a cross-linkable monomer, a chain transfer agent, and an emulsifying agent. Alternatively, the polymerization initiator may be added after other materials are first emulsified and then a temperature of the resultant is raised. At this time, it is difficult to adjust a speed of the polymerization reaction in the former case, and it is easy to adjust a speed of the polymerization reaction in the latter case.

If necessary, the polymerization initiator may further include an additive, for example, a UV absorber, an antioxidant, an agent to improve color development, and the like.

An extent of cross-linking of the polymer resin constituting the capsulated colorant may be adjusted by controlling an amount and injection method of the chain transfer agent. That is, since the gel content can represent the extent of cross-linking of the polymer resin as described above, a capsulated colorant coated with a polymer resin having different gel contents can be prepared.

When an amount of the chain transfer agent is 0.05 to 2 parts by weight with respect to 100 parts by weight of the polymerizable unsaturated monomer, the gel content of the capsulated colorant is 70 to 99%. When the amount of the chain transfer agent is 2.5 to 4.5 parts by weight, the gel content of the capsulated colorant is 30 to 60%.

In addition, depending on a method of adding the chain transfer agent, the extent of cross-linking of the polymer resin, that is, the gel content, can be adjusted. In general, the method of adding the chain transfer agent can be a method of adding a total amount of the chain transfer agent in a preparation process of the polymerization composition in room temperature, or a method of further consecutively adding the chain transfer agent as the polymerization reaction proceeds.

In the former method, the extent of its cross-linking of the polymer resin coating the colorant can be constantly maintained. In the latter method, the extent of its cross-linking of the polymer resin coating the colorant can be changed according to a thickness thereof.

The present general inventive concept also provides an ink composition including the capsulated colorant, an organic solvent and water.

In the ink composition according to the present general inventive concept, an amount of the capsulated colorant may be 1-20 parts by weight, 2-10 parts by weight, and may also be 3-7 parts by weight, with respect to 100 parts by weight of the ink composition.

When an amount of the capsulated colorant is less than 1 part by weight with respect to 100 parts by weight of the ink composition, a desired optical density can not be realized. When the amount of the capsulated colorant is greater than 20 parts by weight with respect to 100 parts by weight of the ink composition, a viscosity of the ink composition is too high, and thus ejection performance of the ink composition is degraded.

The solvent used in the ink composition according to the present general inventive concept can be a water-based solvent, such as water, and may further include at least one organic solvent. An amount of the solvent may be 80-99 parts by weight, 85-98 parts by weight, and may also be 90-97 parts by weight, with respect to 100 parts by weight of the ink composition.

When an amount of the solvent is less than 80 parts by weight with respect to 100 parts by weight of the ink composition, the viscosity of the ink composition is excessively high so that the ejection performance is degraded. When the amount of the solvent is greater than 99 parts by weight with respect to 100 parts by weight of the ink composition, a surface tension of the ink composition is increased so that the ejection performance is degraded.

The organic solvent included in the solvent may be at least one of an alcohol-based solvent, a ketone-based solvent, an ester-based solvent, a polyhydric alcohol-based solvent, a nitrogen-containing solvent, and a sulfur-containing compound.

The alcohol-based solvent which can be used as the organic solvent may be methyl alcohol, ethyl alcohol, n-propyl alcohol, isopropyl alcohol, n-butyl alcohol, sec-butyl alcohol, t-butyl alcohol, or isobutyl alcohol. The ketone-based solvent may be acetone, methyl ethyl ketone, diethyl ketone, or diacetone alcohol. The ester-based solvent may be methyl acetate, ethyl acetate, or ethyl lactate. The polyhydric alcohol-based solvent may be ethylene glycol, diethylene glycol, triethylene glycol, propylene glycol, butylenes glycol, 1,4-butanediol, 1,2,4-butane triol, 1,5-pentanediol, 1,2,6-hexanetriol, hexylene glycol, glycerol, glycerol ethoxylate, or trimethylolpropane ethoxylate. A monovalent alcohol used as an organic solvent adjusts the surface tension of ink, and thus can improve penetrability, dot forming ability, and drying properties of a printed image on a recoding medium, such as a usual sheet or a professional sheet. In addition, polyhydric alcohols and derivatives thereof do not easily evaporate and reduce a freezing point of ink, thereby improving a storage stability of ink. As a result, the clogging of nozzles can be prevented.

Examples of the nitrogen-containing solvent which can be used as an organic solvent may include 2-pyrolidone and N-methyl-2-pyrolidone. The sulfur-containing compound may be dimethyl sulfoxide, tetramethylenesulfone, or thioglycol.

When the organic solvent as described above is used with a water-based solvent, such as water, an amount of the organic solvent may be 0.1-130 parts by weight, and may also be 10-50 parts by weight, with respect to 100 parts by weight of water. When the amount of the organic solvent is less than 0.1 parts by weight with respect to 100 parts by weight of water, the surface tension of ink is excessively increased. When the amount of the organic solvent is greater than 130 parts by weight with respect to 100 parts by weight of water, the ejection properties of ink are reduced.

The ink composition according to the present general inventive concept may further include various additives in order to enhance properties of the ink composition. In particular, the additives may be at least one of a wetting agent, a dispersant, a surfactant, a viscosity modifier, a pH controlling agent, and an antioxidant. An amount of the additive may be 0.5-600 parts by weight, and may also be 10-300 parts by weight, with respect to 100 parts by weight of the colorant. When the amount of the additive is less than 0.5 parts by weight with respect to 100 parts by weight of the colorant, the performance of the ink are poor. When the amount of the additive is greater than 600 parts by weight with respect to 100 parts by weight of the colorant, the storage stability of ink is reduced.

In particular, the surfactant used as the additive is not particularly limited, and may be appropriately selected corresponding to the purpose of use. For example, the surfactant may be an ampholytic surfactant, an anionic surfactant, a cationic surfactant, a non-ionic surfactant, or the like. The surfactant may be used alone, or used in combination of two or more.

The ampholytic surfactant may be alanine, dodecyldi(aminoethyl)glycine, di(octylaminoethyl)glycine, N-alkyl-N,N-dimethylammoniumbetaine, or the like.

The anionic surfactant may be an alkylbenzenesulfonic acid salt, an $\alpha$-olefinesulfonic acid salt, a polyoxyethylene alkyl ether acetic acid salt surfactant, phosphate ester, or the like.

The cationic surfactant may be an amine salt type surfactant, such as an alkyl amine salt, an amino alcohol fatty acid derivative, a polyamine fatty acid derivative, imidazoline, or the like, or a quaternary ammonium salt type surfactant, such as an alkyltrimethyl ammonium salt, a dialkyldimethyl ammonium salt, an alkyldimethylbenzyl ammonium salt, a pyridinium salt, an alkylisoquinolinium salt, and benzethonium chloride.

The non-ionic surfactant may be a polyoxyethylene alkyl ether surfactant, a polyoxyethylene alkyl phenyl ether surfactant, an acetylene glycol surfactant, or the like.

Among the surfactants described above, the non-ionic surfactant may be used due to excellent antifoaming performance.

The non-ionic surfactant may be SURFYNOL series manufactured by Air Products, which have an acetylenic ethoxylated diol structure, TERGITOL series manufactured by Union Carbide, which have a polyethylene oxide or polypropylene oxide structure, Tween series having a polyoxyethylene sorbitan fatty acid ester structure, or the like.

To provide an optimal state of use, the ink composition according to the present general inventive concept may have a surface tension of 15-70 dyne/cm, or may be 25-55 dyne/cm at 20° C., and may have a viscosity of 1-20 cps, or may also be 1.5-3.5 cps at 20° C. When the surface tension of the ink composition is beyond these ranges, the printing performance of the ink composition is degraded. When the viscosity of the ink composition is beyond these ranges, the ink composition is not satisfactorily ejected.

An ink set according to the present general inventive concept may use at least two ink compositions having different compositions from each other, each of the ink compositions being constituted by the ink composition according to the present general inventive concept.

For example, the ink set may include one ink composition including a capsulated colorant having a gel content of 70-99% and one ink composition including a capsulated colorant having a gel content of 30-60%.

In the ink set that uses two ink compositions including capsulated colorants having different gel contents from each other, the ink composition including the capsulated colorant having a larger gel content, that is, a cross-linking of larger extent, may be used to print characters, and the ink composition including the capsulated colorant having a smaller gel content, that is, a cross-linking of smaller extent may be used to print images.

Herein, the capsulated colorant having a larger gel content is very hard so that the ink is poorly spread onto paper. Therefore, there is no change in the thickness of printed ink composition, and thus characters having excellent optical density can be realized. In addition, the capsulated colorant having a smaller gel content spread well onto paper, and thus the ink composition can be uniformly and smoothly spread on paper after being printed. Therefore, images with excellent durability and printing gloss can be realized. Accordingly, the ink set according to the present general inventive concept can provide improved printed resultant both in the case of characters and images.

The ink set may be supplied to an ink accommodation unit or inkjet printer cartridge of an inkjet recording device. An inkjet recording device of the present general inventive concept may include a thermal head in which ink droplets are ejected using water vapor pressure generated by heating an ink composition, a piezo head in which ink droplets are ejected using a piezo device, a disposable head, or a permanent head. In addition, the inkjet recording device may be a scanning type printer or an array type printer, and can be used for desktop, textile, and for industrial purposes. The head types, printer types, and uses of the inkjet recording device of the present general inventive concept have been described only for more detailed description, but the present general inventive concept is not limited thereto. In addition, the ink composition of the present general inventive concept is not particularly limited to the inkjet recording device as described above, and can also be used in various other inkjet recording devices.

Each substituent used in defining the compounds according to the present general inventive concept can be defined as follows.

The alkyl group used herein refers to a linear or branched saturated monovalent hydrocarbon radical having from 1 to 20, from 1 to 10, or also from 1 to 6 carbon atoms. The unsubstituted alkyl group used herein may be methyl, ethyl, propyl, isobutyl, sec-butyl, tert-butyl, pentyl, iso-amyl, hexyl, or the like. At least one hydrogen atom included in the unsubstituted alkyl group may be substituted with a halogen atom, a hydroxyl group, a nitro group, a cyano group, a substituted or unsubstituted amino group (—$NH_2$, —NH(R), —N(R')(R'') where R' and R'' are each independently a $C_1$-$C_{10}$ alkyl group), an amidino group, hydrazine, hydrazone, a carboxyl group, a sulfonic acid group, a phosphoric acid group, a $C_1$-$C_{20}$ alkyl group, a $C_1$-$C_{20}$ halogenized alkyl group, a $C_1$-$C_{20}$ alkenyl group, a $C_1$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

Figure 1:
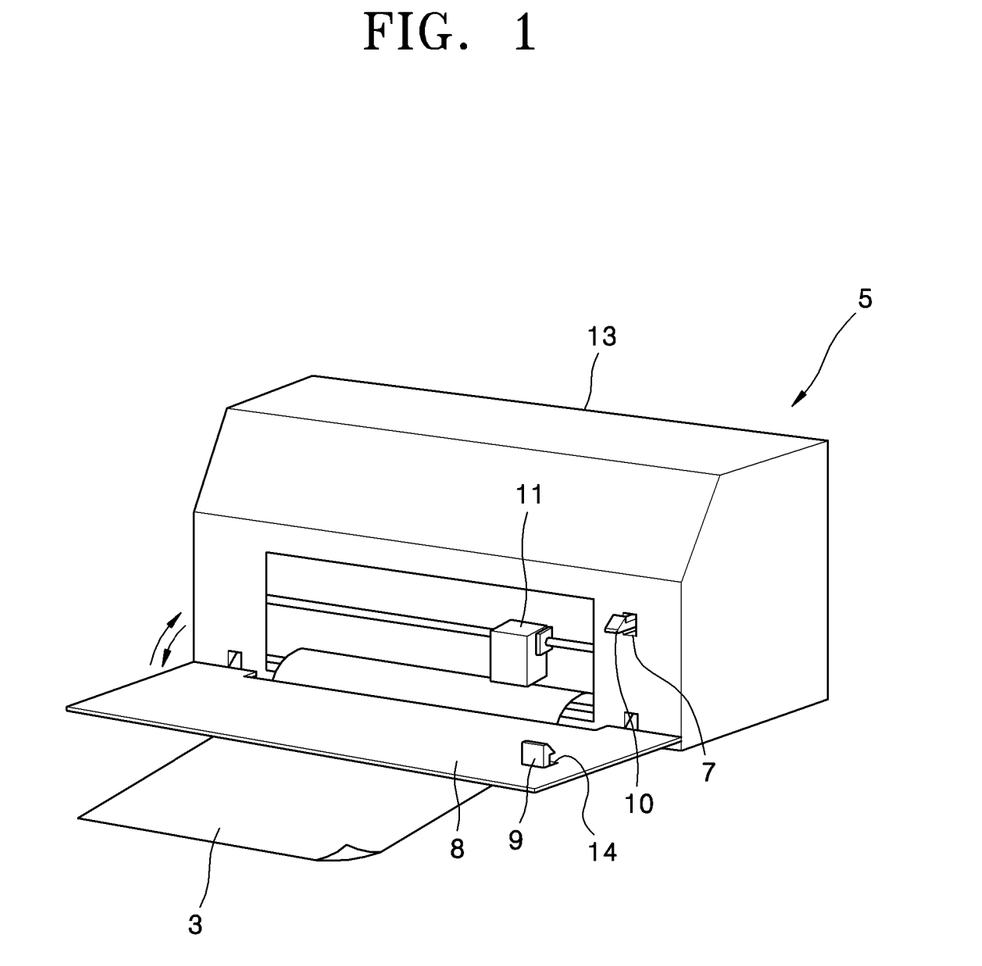
FIG. 1 is a perspective view illustrating an inkjet recording device including an ink cartridge according to an embodiment of the present general inventive concept.

FIG. 1 is a perspective view illustrating an inkjet recording device including an ink cartridge according to an embodiment of the present general inventive concept.

Referring to FIG. 1, an inkjet recording device includes an inkjet printer cartridge 11 which includes an ink composition including a large chromophore containing colorant and a colorant-like additive. A printer cover 8 is connected to a body 13 of a printer 5. An engaged region of a movable latch 10 protrudes through a hole 7. The movable latch 10 is engaged with a fixed latch 9. When the printer cover 8 is closed, the movable latch 10 is engaged with the fixed latch 9, and the fixed latch 9 contacts the movable latch 10 inside of the printer cover 8. The printer cover 8 has a recess 14 corresponding to the engaged portion of a movable latch 10 extending the hole 7. The inkjet printer cartridge 11 is located such that ink is ejected onto a sheet of paper 3 passing under the ink cartridge 11.

Figure 2:
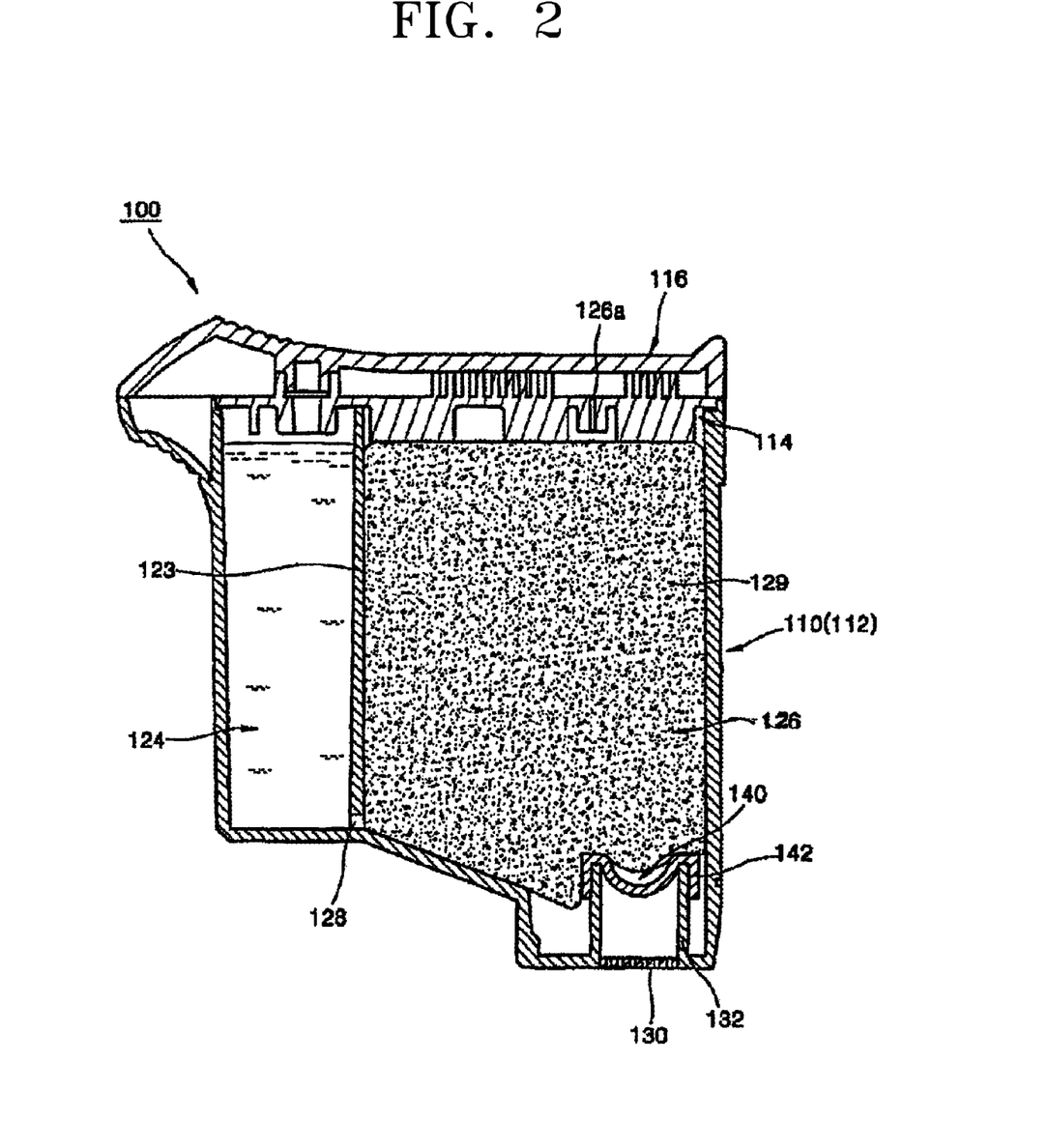
FIG. 2 is a horizontal and sectional view illustrating an ink cartridge according to an embodiment of the present general inventive concept.

FIG. 2 is a horizontal and sectional view illustrating an inkjet printer cartridge 100 including the ink set, according to an embodiment of the present general inventive concept. Referring to FIG. 2, the inkjet printer cartridge 100 includes an ink cartridge body 110 forming an ink container 112, an inner cover 114 covering the ink container 112, and an outer cover 116 separated from the inner cover 114 by a predetermined distance to seal the ink container 112 and the inner cover 114.

The ink container 112 is divided into a first chamber 124 and a second chamber 126 by a vertical barrier 123. An ink passage 128 between the first chamber 124 and the second chamber 126 is formed at the lowest portion of the vertical barrier 123. The first chamber 124, a sponge 129, and the second chamber 126 are sequentially filled with ink. A vent hole 126a corresponding to the second chamber 126 is formed on the inner cover 114.

A filter 140 is located in a lower portion of the second chamber 126 to filter the impurities and fine bubbles of ink so as to prevent ejection holes of a printer head 130 from being clogged. A hook 142 is located on an edge of the filter 140 and on a higher portion of a standpipe 132. Ink is ejected in the form of droplets to a printing medium from the ink container 112 through the ejection holes of a printer head 130.

The present general inventive concept will now be described in further detail with reference to the following examples. These examples are for illustrative purpose only and are not intended to limit the scope of the present general inventive concept.

Preparation of Capsulated Colorant Having Cross-Linked Structure

Example 1-1

1,360 g of distilled water, 384.8 g of carbon black (Cabot company, cabojet-300), 7 g of NaOH, 9 g of disodium didodecyl diphenyloxide disulfonate (DPOS, product of CYTEC, America), 32.4 g of itaconic acid, 10 g of acrylic acid, 120 g of styrene monomer, and 3.2 g of t-dodecylmercaptan were added to 5 l of an autoclave equipped with a stirrer, and the mixture was substituted with nitrogen while being stirred at 250 rpm. 30 g of butadiene was then added to the autoclave, and then nitrogen was added to the autoclave to increase the pressure of the autoclave by 2 kg/$cm^2$. The mixture was fully mixed while being stirred for 30 minutes, and then the temperature of the autoclave was raised to 77° C. and simultaneously 0.36 g of ammonium persulfate was added to the autoclave. Then, the temperature of the autoclave was decreased to 70° C., and the mixture was stirred for 300 minutes to prepare a capsulated colorant. A gel content of the obtained capsulated colorant was 75%.

Example 1-2

1,360 g of distilled water, 384.8 g of carbon black (Cabot company, cabojet-300), 7 g of NaOH, 9 g of disodium didodecyl diphenyloxide disulfonate (DPOS, product of CYTEC, America), 32.4 g of itaconic acid, 10 g of acrylic acid, 120 g of styrene monomer, and 0.1 g of t-dodecylmercaptan were added to 5 l of an autoclave equipped with a stirrer, and the mixture was substituted with nitrogen while being stirred at 250 rpm. 30 g of butadiene monomer was then added to the autoclave, and then nitrogen was added to the autoclave to increase the pressure of the autoclave by 2 kg/$cm^2$. The mixture was fully mixed while being stirred for 30 minutes, and then the temperature of the autoclave was raised to 77° C. and simultaneously 0.36 g of ammonium persulfate was added to the autoclave. Then, the temperature of the autoclave was decreased to 70° C., and the mixture was stirred for 300 minutes to prepare a capsulated colorant. A gel content of the obtained capsulated colorant was 97%.

Example 1-3

1,360 g of distilled water, 384.8 g of carbon black (Cabot company, cabojet-300), 7 g of NaOH, 9 g of disodium didodecyl diphenyloxide disulfonate (DPOS, product of CYTEC, America), 32.4 g of itaconic acid, 10 g of acrylic acid, 120 g of styrene monomer, and 7.8 g of t-dodecylmercaptan were added to 5 l of an autoclave equipped with a stirrer, and the mixture was substituted with nitrogen while being stirred at 250 rpm. 30 g of butadiene monomer was then added to the autoclave, and then nitrogen was added to the autoclave to increase the pressure of the autoclave by 2 kg/cm². The mixture was fully mixed while being stirred for 30 minutes, and then the temperature of the autoclave was raised to 77° C. and simultaneously 0.36 g of ammonium persulfate was added to the autoclave. Then, the temperature of the autoclave was decreased to 70° C., and the mixture was stirred for 300 minutes to prepare a capsulated colorant. A gel content of the obtained capsulated colorant was 35%.

Example 1-4

1,360 g of distilled water, 384.8 g of carbon black (Cabot company, cabojet-300), 7 g of NaOH, 9 g of disodium didodecyl diphenyloxide disulfonate (DPOS, product of CYTEC, America), 32.4 g of itaconic acid, 10 g of acrylic acid, 120 g of styrene monomer, and 5.2 g of t-dodecylmercaptan were added to 5 l of an autoclave equipped with a stirrer, and the mixture was substituted with nitrogen while being stirred at 250 rpm. 30 g of butadiene monomer was then added to the autoclave, and then nitrogen was added to the autoclave to increase the pressure of the autoclave by 2 kg/cm². The mixture was fully mixed while being stirred for 30 minutes, and then the temperature of the autoclave was raised to 77° C. and simultaneously 0.36 g of ammonium persulfate was added to the autoclave. Then, the temperature of the autoclave was decreased to 70° C., and the mixture was stirred for 300 minutes to prepare a capsulated colorant. A gel content of the obtained capsulated colorant was 58%.

Preparation of Capsulated Colorant which does not have Cross-Linked Structure

Comparative Example 1-1

1,360 g of distilled water, 384.8 g of carbon black (Cabot company, cabojet-300), 7 g of NaOH, 9 g of disodium didodecyl diphenyloxide disulfonate (DPOS, product of CYTEC, America), 32.4 g of itaconic acid, 10 g of acrylic acid, and 150 g of styrene monomer were added to 5 l of an autoclave equipped with a stirrer, and the mixture was substituted with nitrogen while being stirred at 250 rpm. Then, nitrogen was added to the autoclave to increase the pressure of the autoclave by 2 kg/cm². The mixture was fully mixed while being stirred for 30 minutes, and then the temperature of the autoclave was raised to 77° C. and simultaneously 0.36 g of ammonium persulfate was added to the autoclave. Then, the temperature of the autoclave was decreased to 70° C., and the mixture was stirred for 300 minutes to prepare a capsulated colorant. A gel content of the obtained capsulated colorant was 2%.

Comparative Example 1-2

1,360 g of distilled water, 384.8 g of carbon black (Cabot company, cabojet-300), 7 g of NaOH, 9 g of disodium didodecyl diphenyloxide disulfonate (DPOS, product of CYTEC, America), 32.4 g of itaconic acid, 40 g of acrylic acid, and 120 g of styrene monomer were added to 5 l of an autoclave equipped with a stirrer, and the mixture was substituted with nitrogen while being stirred at 250 rpm. Then, nitrogen was added to the autoclave to increase the pressure of the autoclave by 2 kg/cm². The mixture was fully mixed while being stirred for 30 minutes, and then the temperature of the autoclave was raised to 77° C. and simultaneously 0.36 g of ammonium persulfate was added to the autoclave. Then, the temperature of the autoclave was decreased to 70° C., and the mixture was stirred for 300 minutes to prepare a capsulated colorant. A gel content of the obtained capsulated colorant was 5%.

Comparative Example 1-3

1,360 g of distilled water, 384.8 g of carbon black (Cabot company, cabojet-300), 7 g of NaOH, 9 g of disodium didodecyl diphenyloxide disulfonate (DPOS, product of CYTEC, America), 42.4 g of itaconic acid, 20 g of acrylic acid, and 130 g of styrene monomer were added to 5 l of an autoclave equipped with a stirrer, and the mixture was substituted with nitrogen while being stirred at 250 rpm. Then, nitrogen was added to the autoclave to increase the pressure of the autoclave by 2 kg/cm². The mixture was fully mixed while being stirred for 30 minutes, and then the temperature of the autoclave was raised to 77° C. and simultaneously 0.36 g of ammonium persulfate was added to the autoclave. Then, the temperature of the autoclave was decreased to 70° C., and the mixture was stirred for 300 minutes to prepare a capsulated colorant. A gel content of the obtained capsulated colorant was 4%.

<Preparation of Ink Composition>

The capsulated colorants prepared by Examples 1-1 through 1-4, water, an organic solvent, and additives were mixed with compositions described as below. Then, each mixture was fully stirred for at least 30 minutes in a stirrer to make the mixtures uniform. Thereafter, the mixture was passed through a 0.45 μm filter to prepare ink composition of Examples 2-1 through 2-4.

Example 2-1

| | |
|---|---|
| Capsulated colorant of Example 1-1 | 4.5 parts by weight |
| Glycerol | 7.5 parts by weight |
| Diethylene glycol | 8 parts by weight |
| Water (deionized water) | 80 parts by weight |
| Glycerol propoxylate | 4 parts by weight |
| 1,3-dimethyl-3,4,5,6-tetrahydro-pyrimidinone | 4 parts by weight |

Example 2-2

| | |
|---|---|
| Capsulated colorant of Example 1-2 | 4.5 parts by weight |
| Glycerol | 7.5 parts by weight |
| Diethylene glycol | 8 parts by weight |
| Water (deionized water) | 80 parts by weight |
| Trimethylolpropane propoxylate | 4 parts by weight |
| 1,3-dimethyl-3,4,5,6-tetrahydro-pyrimidinone | 4 parts by weight |

Example 2-3

| | |
|---|---|
| Capsulated colorant of Example 1-3 | 4.5 parts by weight |
| Glycerol | 7.5 parts by weight |
| Diethylene glycol | 8 parts by weight |
| Water (deionized water) | 80 parts by weight |
| Pentaerythritol propoxylate | 4 parts by weight |
| 1,3-dimethyl-2-imidazolidinone | 4 parts by weight |

Example 2-4

| | |
|---|---|
| Capsulated colorant of Example 1-4 | 4.5 parts by weight |
| Glycerol | 7.5 parts by weight |
| Diethylene glycol | 8 parts by weight |
| Water (deionized water) | 80 parts by weight |
| 1,3-dimethyl-2-imidazolidinone | 4 parts by weight |
| 1,3-dimethyl-3,4,5,6-tetrahydro-pyrimidinone | 4 parts by weight |

Comparative Example 2-1

| | |
|---|---|
| Capsulated colorant of Comparative Example 1-1 | 4.5 parts by weight |
| Glycerol | 7.5 parts by weight |
| Diethylene glycol | 8 parts by weight |
| Water (deionized water) | 80 parts by weight |
| Glycerol propoxylate | 4 parts by weight |
| 1,3-dimethyl-3,4,5,6-tetrahydro-pyrimidinone | 4 parts by weight |

Comparative Example 2-2

| | |
|---|---|
| Capsulated colorant of Comparative Example 1-2 | 4.5 parts by weight |
| Glycerol | 7.5 parts by weight |
| Diethylene glycol | 8 parts by weight |
| Water (deionized water) | 80 parts by weight |
| Trimethylolpropane propoxylate | 4 parts by weight |
| 1,3-dimethyl-3,4,5,6-tetrahydro-pyrimidinone | 4 parts by weight |

Comparative Example 2-3

| | |
|---|---|
| Capsulated colorant of Comparative Example 1-3 | 4.5 parts by weight |
| Glycerol | 7.5 parts by weight |
| Diethylene glycol | 8 parts by weight |
| Water (deionized water) | 80 parts by weight |
| Pentaerythritol propoxylate | 4 parts by weight |
| 1,3-dimethyl-2-imidazolidinone | 4 parts by weight |

Comparative Example 3

| | |
|---|---|
| Raven 5250 (manufactured by Columbian co.) | 4.5 parts by weight |
| Glycerol | 7.5 parts by weight |
| Diethylene glycol | 8.0 parts by weight |
| Water (deionized water) | 80.0 parts by weight |

Comparative Example 4

| | |
|---|---|
| Regal 330 (manufactured by Cabot co.) | 4.0 parts by weight |
| Glycerol | 7.5 parts by weight |
| Diethylene glycol | 8.0 parts by weight |
| Water (deionized water) | 80.0 parts by weight |

Comparative Example 5

| | |
|---|---|
| Regal 330 (manufactured by Cabot co.) | 4.5 parts by weight |
| Glycerol | 7.5 parts by weight |
| Diethylene glycol | 8.0 parts by weight |
| Water (deionized water) | 80.0 parts by weight |

Experimental Example 1

Rubfastness Test

The ink compositions prepared by Examples 2-1 through 2-4 and Comparative Examples 2-1 through 2-3 and 3 through 5 were refilled in Ink Cartridge M-50 (manufactured by Samsung) and then a bar picture (2*10 cm) was printed in a printer (MJC-3300p, manufactured by Samsung). Thereafter, the printed image was dried for 24 hours. When rubbing the image 5 times using a tester, optical density (OD) of transferred image of the bar picture was compared to the OD of the image of the bar picture before rubbing and expressed in percentage. The results are shown in Table 1 below.

A=(OD of the transferred printed image/OD of the photo of the bar)×100(%)

◉: A<15
○: 15≤A<30
Δ: 30≤A≤45
X: A>45

Experimental Example 2

Waterfastness Test

The ink compositions prepared by Examples 2-1 through 2-4 and Comparative Examples 2-1 through 2-3 and 3 through 5 were refilled in Ink Cartridge M-50 (manufactured by Samsung) and then a bar picture (2*10 cm) was printed in a printer (MJC-2400C, manufactured by Samsung). After 5 minutes, 5 water drops were added on the printed image and the image was dried for 24 hours. OD decreased after water flowed down was compared to OD of the original bar picture and expressed in percentage. The results were evaluated as follows and are shown in Table 1 below.

A=(OD of the printed image after water flowed down/OD of original bar picture)×100(%)

◉: 95≤A
○: 90≤A<95,
X: 85≤A<90
XX: A<85

Experimental Example 3

Printed Gloss Test

The ink compositions prepared by Examples 2-1 through 2-4 and Comparative Examples 1 through 4 were refilled in Ink Cartridge M-50 (manufactured by Samsung) and then a bar picture (2*10 cm) was printed in a printer (MJC-2400C, manufactured by Samsung). After 120 minutes, printed glosses of the ink compositions were measured using a glossmeter (micro-tri-gross, manufactured by BYK). The results were evaluated as follows and are shown in Table 1 below.

A=Gloss of images
◎: 40≤A
○: 35≤A<40
X: 30≤A<35
XX: A<35

Experimental Example 4

Optical Density Test

The ink compositions prepared by Examples 2-1 through 2-4 and Comparative Examples 2-1 through 2-3 and 3 through 5 were refilled in Ink Cartridge M-50 (manufactured by Samsung) and then a bar picture (2*10 cm) was printed in a printer (MJC-3300p, manufactured by Samsung). Thereafter, the printed image was dried for 24 hours. Optical densities of the ink compositions were measured as follows using an OD tester (GretagMacdeth, manufactured by SpectorEye). The results are shown in Table 1 below.

A=OD of images
◎: A≥1.4
○: 1.2≤A<1.4
Δ: 1.0≤A<1.2
X: A<1.0

TABLE 1

| | capsulation | Cross-linking | Gel content | Rub fastness | Water fastness | Printed gloss | OD |
|---|---|---|---|---|---|---|---|
| Example 2-1 | ○ | ○ | 75 | ◎ | ◎ | ○ | ◎ |
| Example 2-2 | ○ | ○ | 97 | ◎ | ◎ | ○ | ◎ |
| Example 2-3 | ○ | ○ | 35 | ◎ | ◎ | ◎ | ○ |
| Example 2-4 | ○ | ○ | 58 | ◎ | ◎ | ◎ | ○ |
| Comparative Example 2-1 | ○ | X | 2 | ◎ | ◎ | Δ | X |
| Comparative Example 2-2 | ○ | X | 5 | ◎ | ◎ | Δ | Δ |
| Comparative Example 2-3 | ○ | X | 4 | ◎ | ◎ | Δ | X |
| Comparative Example 3 | X | X | 0 | X | ○ | X | X |
| Comparative Example 4 | X | X | 0 | X | Δ | Δ | Δ |
| Comparative Example 5 | X | X | 0 | Δ | X | X | X |

Referring to Table 1, it can be seen that the ink compositions of Examples 2-1 through 2-4 which include the capsulated colorant having a cross-linked structure according to the present general inventive concept have excellent rubfastness, waterfastness, printed gloss and optical density, compared to the ink compositions of Comparative Examples 2-1 through 2-3 which include a capsulated colorant or a colorant that does not include a cross-linked structure, and the ink compositions of Comparative Examples 3 through 5 which include a conventional colorant.

According to the present general inventive concept, by adjusting an extent of cross-linking of the colorant on which the polymer having a cross-linked structure is coated, a capsulated colorant having a cross-linking of larger extent and a capsulated colorant having a cross-linking of smaller extent are obtained. By using the ink composition including the capsulated colorant having a cross-linking of larger extent, characteristics of excellent waterfastness, lighffastness, rubfastness and optical density can be realized. In addition, by using the ink composition including the capsulated colorant having a cross-linking of smaller extent, images with excellent durability and printed gloss can be realized.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. An ink set comprising:
at least two ink compositions comprising a capsulated colorant, the capsulated colorant comprising:
a colorant; and
a polymer resin which is coated onto the colorant and has a cross-linked structure,
wherein the polymer resin having a cross-linked structure is prepared by polymerizing a composition comprising a polymerizable unsaturated monomer, a cross-linkable monomer, and a chain transfer agent,
wherein the ink set comprises one ink composition comprising a capsulated colorant having a gel content of about 30 to about 60 wt. % and one ink composition comprising a capsulated colorant having a gel content of about 70 to about 99 wt. %,
wherein the polymerizable unsaturated monomer is at least one selected from unsaturated carboxylic acid, cyanide vinyl monomer, unsaturated carboxylic alkylester, unsaturated carboxylic hydroxyalkyl ester, unsaturated carboxylic amide and its derivatives, aromatic vinyl monomer, methyl vinyl ketone and vinylidene chloride, and
wherein the cross-linkable monomer is at least one selected from (meth)acrylate and a vinyl compound other than (meth)acrylate.
2. A cartridge for an inkjet recording device, comprising the ink set according to claim 1.
3. An inkjet recording device comprising a cartridge for an inkjet recording device, the cartridge comprising the ink set according to claim 1.

* * * * *

UNITED STATES PATENT AND TRADEMARK OFFICE
CERTIFICATE OF CORRECTION

PATENT NO. : 8,859,639 B2  Page 1 of 1
APPLICATION NO. : 12/177908
DATED : October 14, 2014
INVENTOR(S) : Jong-in Lee et al.

It is certified that error appears in the above-identified patent and that said Letters Patent is hereby corrected as shown below:

On the Title Page

Column 2, Item [57] (Abstract), Line 12, Delete "lighffastness," and insert -- lightfastness, --, therefor.

Signed and Sealed this
Thirtieth Day of June, 2015

Michelle K. Lee
*Director of the United States Patent and Trademark Office*